United States Patent [19]

Samejima et al.

[11] Patent Number: 5,018,344

[45] Date of Patent: May 28, 1991

[54] LAWN MOWER WITH BLOWER UNIT

[75] Inventors: Kazuo Samejima; Shinichiro Inoue; Takao Sakatsuji; Hideo Kida; Kiyoto Kasamatsu; Hironori Tsuchihashi; Akiyoshi Takemoto; Tsuyoshi Sato; Toshihiko Hamada; Masatami Fukuda, all of Sakai, Japan

[73] Assignee: Kubota, Ltd., Osaka, Japan

[21] Appl. No.: 581,438

[22] Filed: Sep. 10, 1990

Related U.S. Application Data

[63] Continuation of Ser. No. 359,067, May 26, 1989, abandoned.

[30] Foreign Application Priority Data

Aug. 24, 1988 [JP] Japan .................. 63-110950[U]
Sep. 20, 1988 [JP] Japan .................. 63-122883[U]

[51] Int. Cl.$^5$ ............................................. A01D 34/70
[52] U.S. Cl. .................................... 56/13.3; 56/16.6; 56/202
[58] Field of Search ............... 56/199, 200, 202, 203, 56/204, 205, 206, 320.2, 16.6, 13.3

[56] References Cited

U.S. PATENT DOCUMENTS 3,949,540  4/1976  Christopherson et al. ........... 56/202
4,735,037  4/1988  Benter ............................. 56/202 X
4,881,362  11/1989  Parker et al. ..................... 56/202

Primary Examiner—Terry Lee Melius
Attorney, Agent, or Firm—Jordan and Hamburg

[57] ABSTRACT

A lawn mower comprising a blade housing supported above the ground by wheels, and a blower case removably connected to one lateral side of the blade housing for blowing grass clippings toward a grass catcher disposed rearwardly of a vehicle body. The blade housing carries wheel support frames secured thereto and extending in a fore and aft direction of the vehicle body. A forward coupling and a rear coupling are secured to one of the wheel support frames for connecting the blower case to the blade housing.

23 Claims, 7 Drawing Sheets

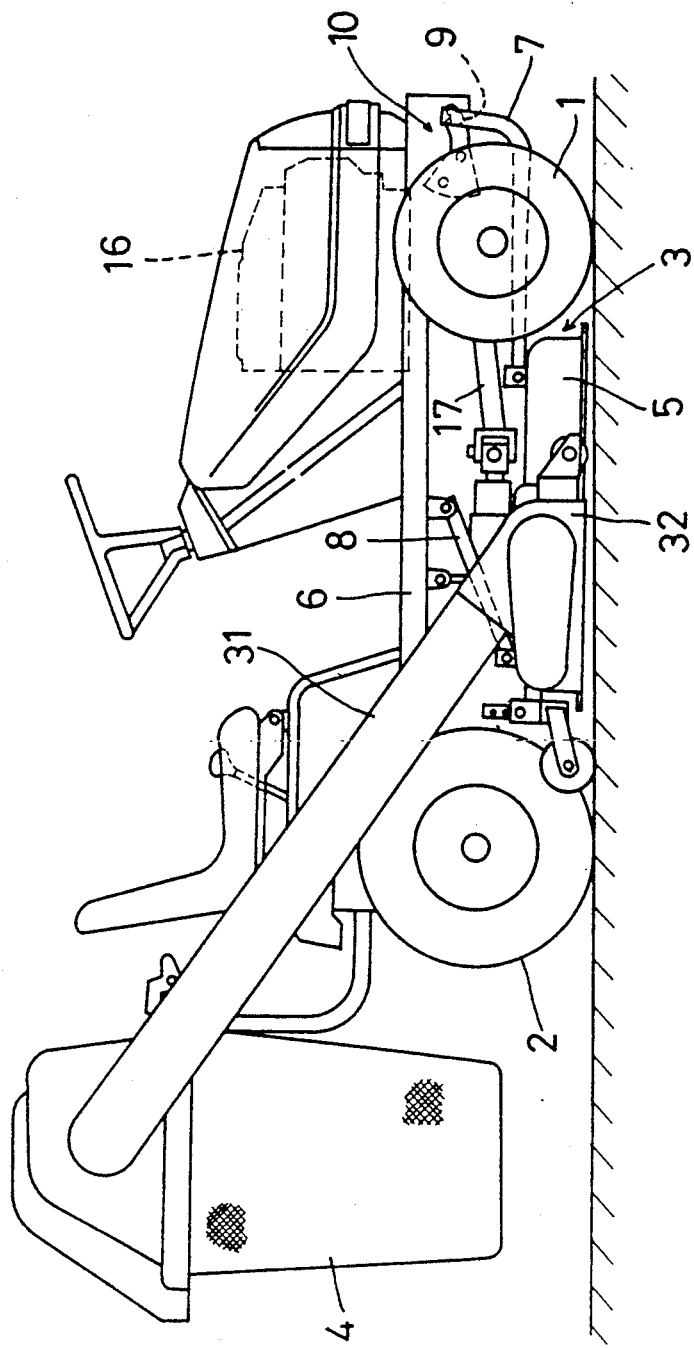

LAWN MOWER WITH BLOWER UNIT

This application is a continuation, of application Ser. No. 359,067, filed May 26, 1989 now abandoned.

BACKGROUND OF THE INVENTION

The present invention relates to a lawn mower having a cutting blade housing supported above the ground by wheels, and a blower case removably connected to one lateral side of the blade housing for blowing grass clippings toward a grass catcher disposed rearwardly of the mower.

In a known lawn mower, the blower case is directly attached to the blade housing. Since the blower case contains a rotary fan for blowing grass clippings, the blower case vibrates during a grass cutting operation. The known construction has the drawback that the blade housing formed of sheet metal may develop cracks due to metal fatigue after a long period of use.

For eliminating this drawback it is conceivable to provide a special, strong frame at the connection between the blade housing and blower case. This measure, however, has the disadvantage of increasing the number of components and unduly complicating the construction.

SUMMARY OF THE INVENTION

The object of the present invention is to provide a lawn mower having a blower case rigidly attached by effectively utilizing an existing component without complicating the construction.

In order to achieve the above object, a lawn mower according to the present invention comprises a blade housing supported above the ground by wheels, a blower case removably connected to one lateral side of the blade housing for blowing grass clippings toward a grass catcher disposed rearwardly of a vehicle body, wheel support frame means secured to the blade housing and extending in a fore and aft direction of the vehicle body, and coupling means fixed to the wheel support frame means for connecting the blower case to the blade housing.

In the above construction, blower case attaching brackets are secured to one of the wheel attaching support frames which have a strong construction in order to support the blade housing above the ground through the wheels. Therefore, vibrations of the blower case resulting from a grass cutting operation are received and absorbed by the support frame without imparting an excessive force to the blade housing.

Thus, the blower case is rigidly connected and supported by effectively utilizing the existing wheel support frame without requiring a special, strong support member for the blower case. This achieves improved durability without complicating the construction.

In a preferred embodiment of the invention, the coupling means includes a first coupling and a second coupling spaced apart from each other in the fore and aft direction of the vehicle body, the first coupling having an engaging connection structure, and the second coupling having a pin connection structure.

In this embodiment, the first coupling includes a vertical pin extending from a coupling member provided on the blower case, and engaging recesses defined in the blade housing. The engaging recesses have curved deep ends for receiving the vertical pin. The second coupling includes a U-shaped coupling pin provided on the blower case, and a coupling boss fixed to the blade housing. The coupling pin is pivotable on a vertical axis, slidable along the vertical axis, and spring-loaded downwardly for insertion into the boss.

Further, the coupling member of the blower case may include a contact member for contacting an abutment plate provided on the coupling member of the blade housing to restrict movement in the fore and aft direction of the vertical pin placed in the engaging recesses.

For attaching the blower case to the blade housing according to the above construction, the vertical pin is first pushed into the depths of the engaging recesses. In this position, the contact between the pin and inside walls of the curved portions of the engaging recesses restricts lateral movement of the blower case, i.e. movement thereof in the direction in which the pin enters the engaging recesses. The fore and aft movement of the blower case is restricted by the contact between the pin and deep ends of the recesses and by the contact between the abutment plate and contact member. With the vertical pin placed in the engaging recesses, the U-shaped coupling pin is pulled upward, turned about and lowered into the coupling boss, which completes the connecting operation.

Thus, according to the present invention, the blower case is connected to the blade housing by engaging the vertical pin for positioning at one of the couplings while the pin connection is made at the other coupling. This connecting operation is far easier than when the operator holds the entire blower case for positioning at two pin holes.

It is conceivable to employ a cylindrical pin for pivotal connection instead of the above U-shaped coupling pin. However, the use of a cylindrical pin would require high dimensional precision, which has the disadvantage of high shaping cost, and involve troublesome positioning operations. The present invention is free from such disadvantage and trouble in that errors are accommodated by the pivotal movement of the coupling pin.

The foregoing and other objects, features and advantages of the invention will be apparent from the following description of a preferred embodiment of the invention, as illustrated in the accompanying drawings.

BRIEF DESCRIPTION OF THE DRAWINGS

FIG. 1 is a side elevation of a riding type lawn mower,

DESCRIPTION OF THE PREFERRED EMBODIMENT

An embodiment of the present invention will be described hereinafter with reference to the drawings.

FIG. 1 shows a riding type lawn mower according to the present invention. This lawn mower comprises a vehicle body supported by front wheels 1 and rear wheels 2. A cutting unit 3 is vertically movably connected in an undersling fashion to an undersurface of the vehicle body between the front and rear wheels 1 and 2. A grass catcher 4 is mounted rearwardly of the vehicle body for collecting grass clippings blown from the cutting unit 3.

Figure 10:
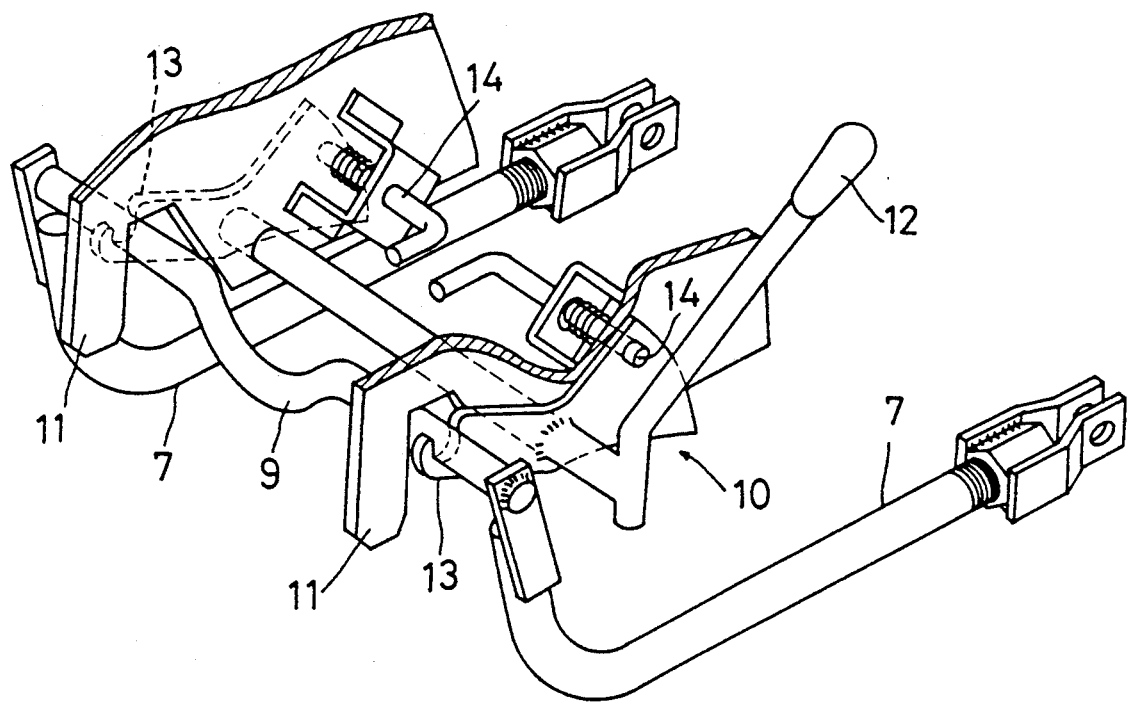
FIG. 10 is a perspective view of a front link connection.
Figure 11:
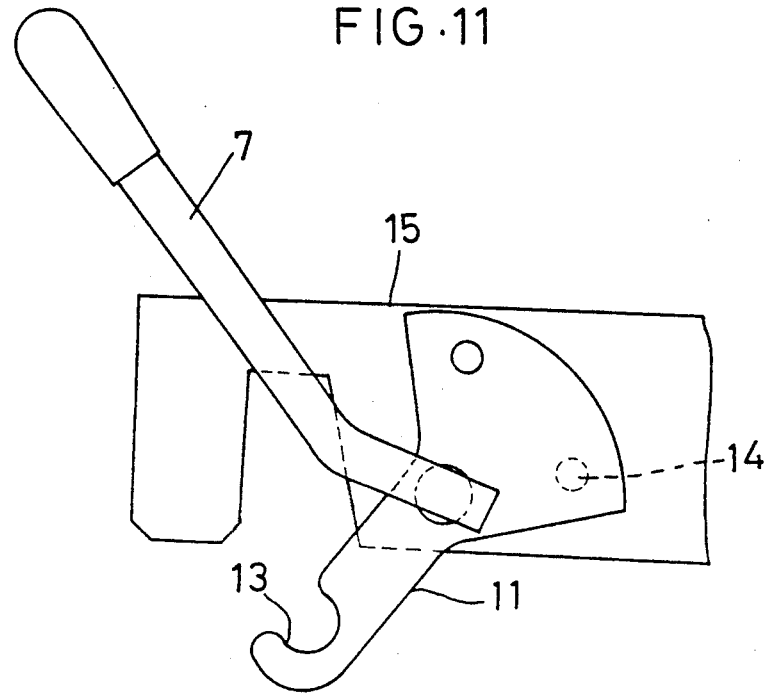
FIG. 11 is a side view of the front link connection.

The cutting unit 3 includes a blade housing 5 pivotally connected to a vehicle frame 6 through a pair of left and right front links 7 and a pair of left and right rear links 8 constituting a parallelogram link mechanism. Thus the cutting unit 3 is vertically movable in a horizontal posture. The front links 7 are rigidly interconnected through an intermediate rod 9 to form a U-shaped structure in plan view. This construction facilitates attaching and detaching operations. The front links 7 are removably attached to a forward end of the vehicle frame 6 through a connecting mechanism 10. More particularly, as shown in FIGS. 10 and 11, the connecting mechanism 10 includes hooks 13 attached to right and left stays 11 extending from the vehicle frame 6. The hooks 13 are pivotable on a transverse axis by operating a rockable control lever 12, and lockable by lock pins 14 while engaging the front links 7. These right and left lock pins 14 are L-shaped, disposed inwardly of the stays 11 and spring-loaded outwardly thereof, to enable the operator to release the lock pins 14 simultaneously with one hand.

Figure 3:
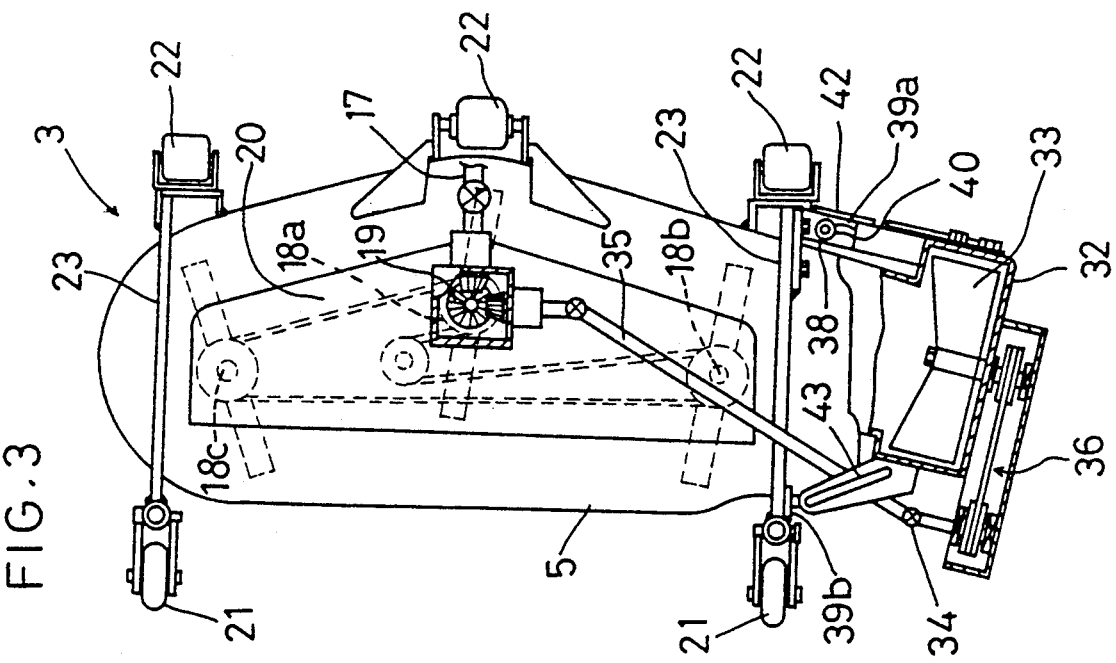
FIG. 3 is a plan view of a cutting unit.

As shown in FIG. 3, the cutting unit 3 includes a bevel gear mechanism 19 mounted at an upper position of a blade drive shaft 18a disposed centrally of the cutting unit 3. The bevel gear mechanism 19 receives drive from an engine 16 mounted on a forward position of the vehicle body through a transmission shaft 17. Right and left blade drive shafts 18b and 18c are driven through a transmission belt 20. The cutting unit 3 further includes wheels arranged at opposite front and rear lateral positions thereof. The rear wheels comprise gauge wheels 21 for supporting the blade housing 5 above the ground. The front wheels comprise free rotation wheels 22 fixedly supported by the blade housing 5 for guiding the cutting unit 3 to ride over mounds and the like.

Figure 8:
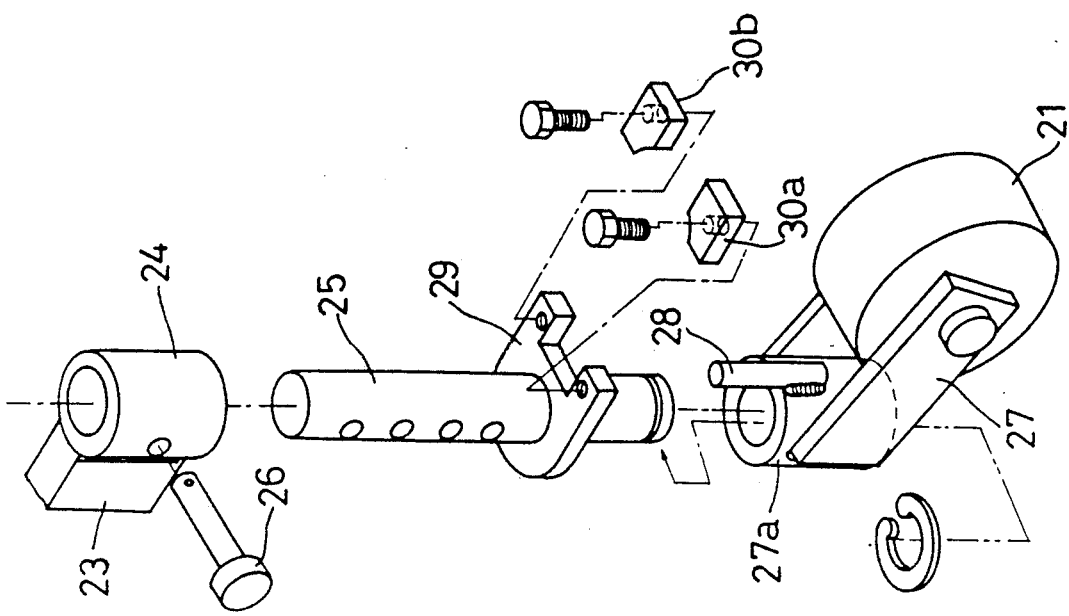
FIG. 8 is an exploded perspective view of a gauge wheel attaching structure.

A support structure of the gauge wheels 21 will be described next. As shown in FIG. 8, a wheel attaching bracket 24 extends from each of support frames 24 extending in the fore and aft direction and rigidly fixed to an upper surface of the blade housing 5. The bracket 24 receives a support axis 25 to be slidable vertically and adjustable to a selected height by a pin 26. A boss 27a of a wheel support arm 27 is relatively rotatably fitted on the support axis 25, the support arm 27 carrying the gauge wheel 21. The support arm 27 is pivotable about the support axis 25 only within a predetermined range of a straight running position extending in the fore and aft direction.

Specifically, a vertically extending stopper pin 28 is fixed to the boss 27a of the support arm 27, while a stopper plate 29 is fixed to the support axis 25 for engaging the stopper pin 28 and allowing the stopper pin 28 to swing only within the predetermined range. Restrictors 30a and 30b are attachable to the stopper plate 29 for varying the pivoting range of the gauge wheel 21 in accordance with a two wheel steering mode of the mower in which only the front wheels are steerable and a four wheel steering mode in which the front and rear wheels are steerable. For the two wheel steering mode, the left restrictor 30a is attached to the stopper plate 29 for allowing the gauge wheel 21 to pivot only to a predetermined angle rightward from the straight running position. For the four wheel steering mode, the right restrictor 30b is attached to the stopper plate 29 for allowing the gauge wheel 21 to pivot only to a predetermined angle leftward from the straight running position.

Figure 9:
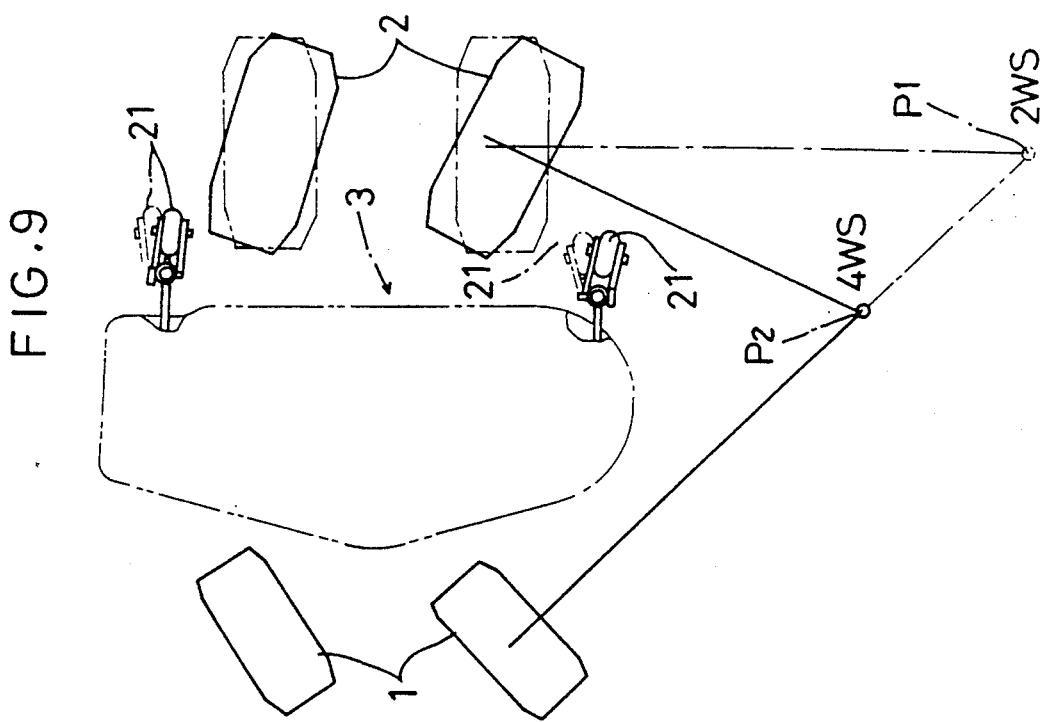
FIG. 9 is a plan view illustrating turning of gauge wheels.

In the two wheel steering mode, the center of turning P1 lies on an extension from an axle axis of the rear wheels 2 as shown in FIG. 9. The gauge wheels 21 are thus smoothly pivotable rightward with turning of the mower, without pushing the grass. In the four wheel steering mode, the center of turning P2 is displaced forwardly and therefore the gauge wheels 21 pivot smoothly leftward.

The blower case 32 is removably connected to the righthand side of the blade housing 5 for blowing grass clippings rearwardly through a duct 31 to the grass catcher 4. The blower case 32 is integrally formed of a plastic material, and contains a fan 33. The fan 33 is driven by the bevel gear mechanism 19 through a universal joint 34, a transmission shaft 35 and a belt transmission 36.

An attachment structure for the blower case 32 will be described next.

Figure 2:
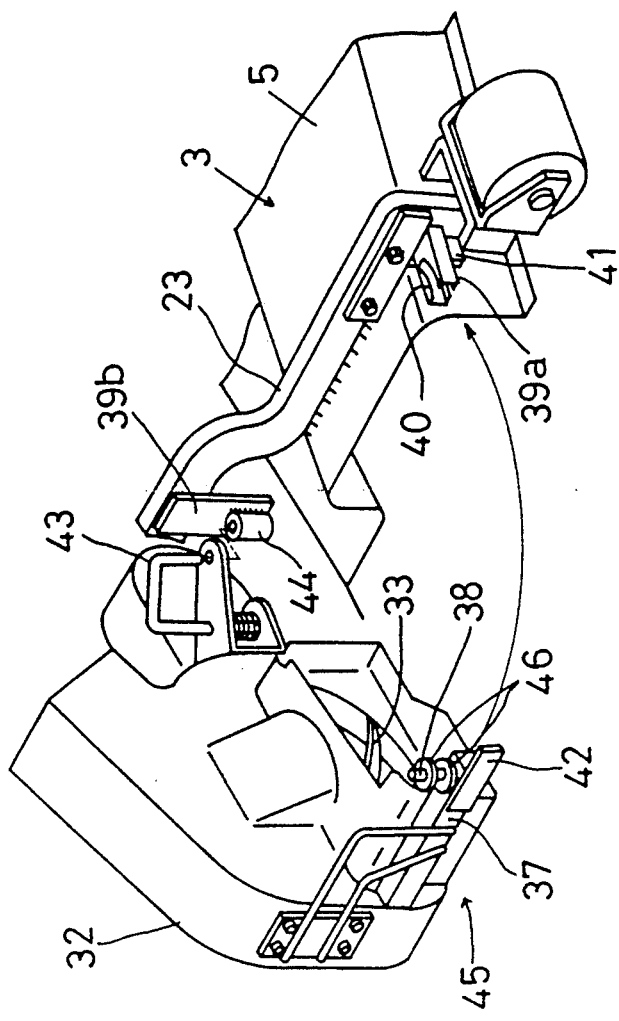
FIG. 2 is a fragmentary perspective view of a blade housing and a blower case.
Figure 4:
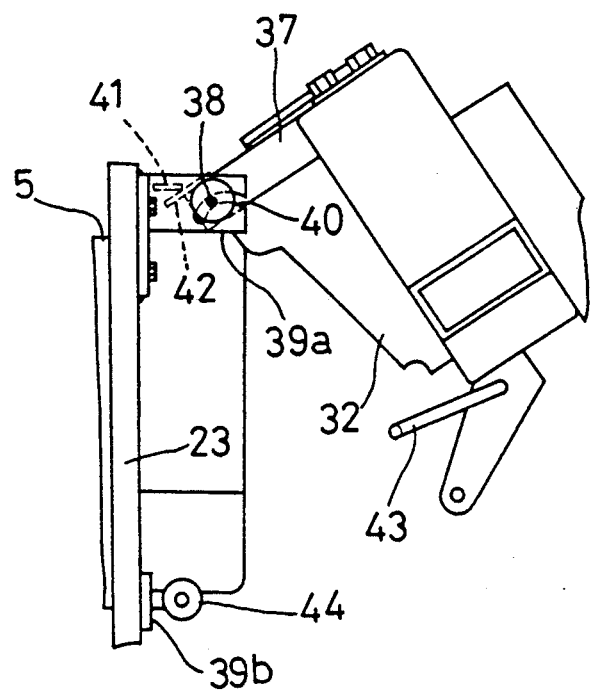
FIG. 4 is a fragmentary plan view of the blade housing and blower case in a partly connected state.
Figure 5:
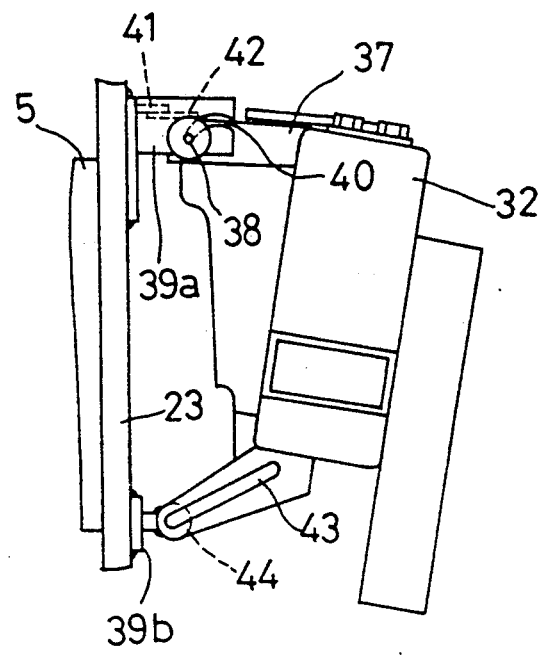
FIG. 5 is a fragmentary plan view of the blade housing and blower case in a fully connected state.

The blower case 32 is pivotally connected at a forward lateral position to the cutting unit 3, and connected at a rear lateral position by a pin to the cutting unit 3. More particularly, as shown in FIGS. 2, 4 and 5, the blower case 32 includes a coupling member 37 extending transversely from an outer forward wall thereof and defining a vertical pin 38 extending upward. The blade housing 5 includes a coupling bracket 39a at a forward position thereof. The bracket 39a defines engaging recesses 40 curved inwardly for receiving the vertical pin 38. The coupling member 37 includes a contact member 42 for contacting an abutment plate 41 provided on the coupling bracket 39a to restrict movement in the fore and aft direction of the vertical pin 38 placed in the engaging recesses 40.

More particularly, the coupling bracket 39a comprises a square pipe extending rightward from one of the support frames 23 and defining the engaging recesses 40 in upper and lower faces thereof. The abutment plate 41 is fixed to the lower face of the square pipe to extend laterally. The coupling member 45 comprises a channel-shaped frame member 37 bolted to the blower case 32, with the vertical pin 38 provided at a free end of the frame member 37. A pair of abutment regulator plates 46 is fixed to the vertical pin 38 for preventing vertical displacement relative to the upper and lower surfaces of the square pipe when the vertical pin 38 enters the engaging recesses 40. The contact member 42 extends from the free end of the frame member 37.

The forward connection of the above construction is made as follows. The vertical pin 38 of the blower case 32 is pushed into the depths of the engaging recesses 40 of the coupling bracket 39a, with the rear of the blower case 32 inclined rightward (see FIG. 4). After moving the blower case 32 from the inclined position to a normal coupling position (FIG. 5), the rear connection is made by the pin as described later. In this position, the contact member 42 contacts the abutment plate 41 to restrict rightward movement of the blower case 32. The contact between the depths of the engaging recesses 40 and the vertical pin 38 restricts leftward movement of the blower case 32. In addition, the contact between inside walls of the engaging recesses 40 and the vertical pin 38 restricts fore and aft movement of the blower case 32.

Figure 7:
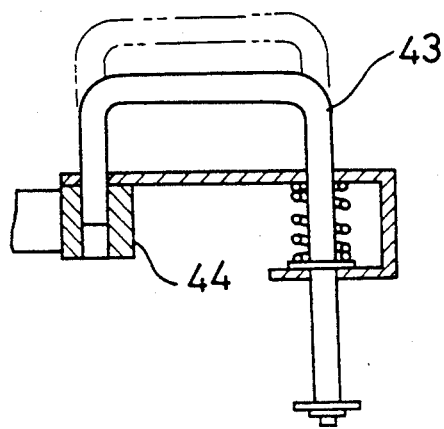
FIG. 7 is a sectional view of a rear connection between the blade housing and blower case.

As also shown in FIG. 7, the blower case 32 includes a coupling pin 43 having an inverted U-shape at a rear position thereof. The coupling pin 43 is pivotable on one arm of the U, vertically slidable and spring-loaded downwardly. The blade housing 5 includes a coupling bracket 39b defining a boss 44 into which the other arm of the U-shaped pin 43 is vertically inserted.

At the forward connection, the vertical pin 38 of the blower case 32 is pushed into the depths of the engaging recesses 40 of the coupling bracket 39a to restrict fore and aft movement of the blower case 32 as described above. Thereafter, at the rear connection, the coupling pin 43 is pulled upward, turned about and placed into the boss 44 of the bracket 39b attached to the blade housing 5, which completes the connecting operation.

The forward and rearward coupling brackets 39a and 39b of the blade housing 5 are secured to one of the wheel support frames 23. These support frames 23 have a strong construction in order to support the cutting unit 3 above the ground through the gauge wheels 21. Therefore, even if the blower case 32 vibrates during a grass cutting operation, there is little possibility of damage such as cracks and, thus, improved durability.

Figure 6:
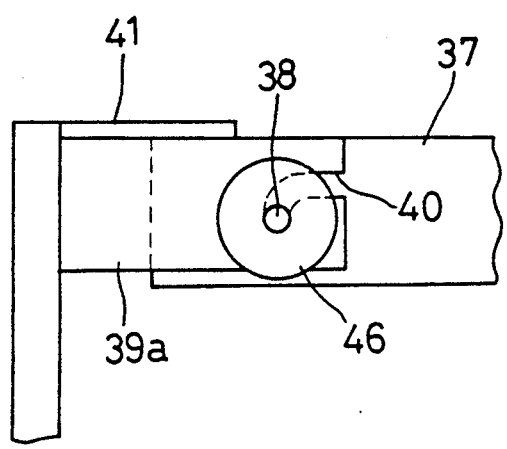
FIG. 6 is a plan view of a modified embodiment.

As shown in FIG. 6, the abutment plate 41 may be provided on a front edge of the square pipe acting as the coupling bracket 39a, with the frame member 37 acting also as the contact member 42.

The forward connection and rear connection may be reversed in the fore and aft direction.

Figure 12:
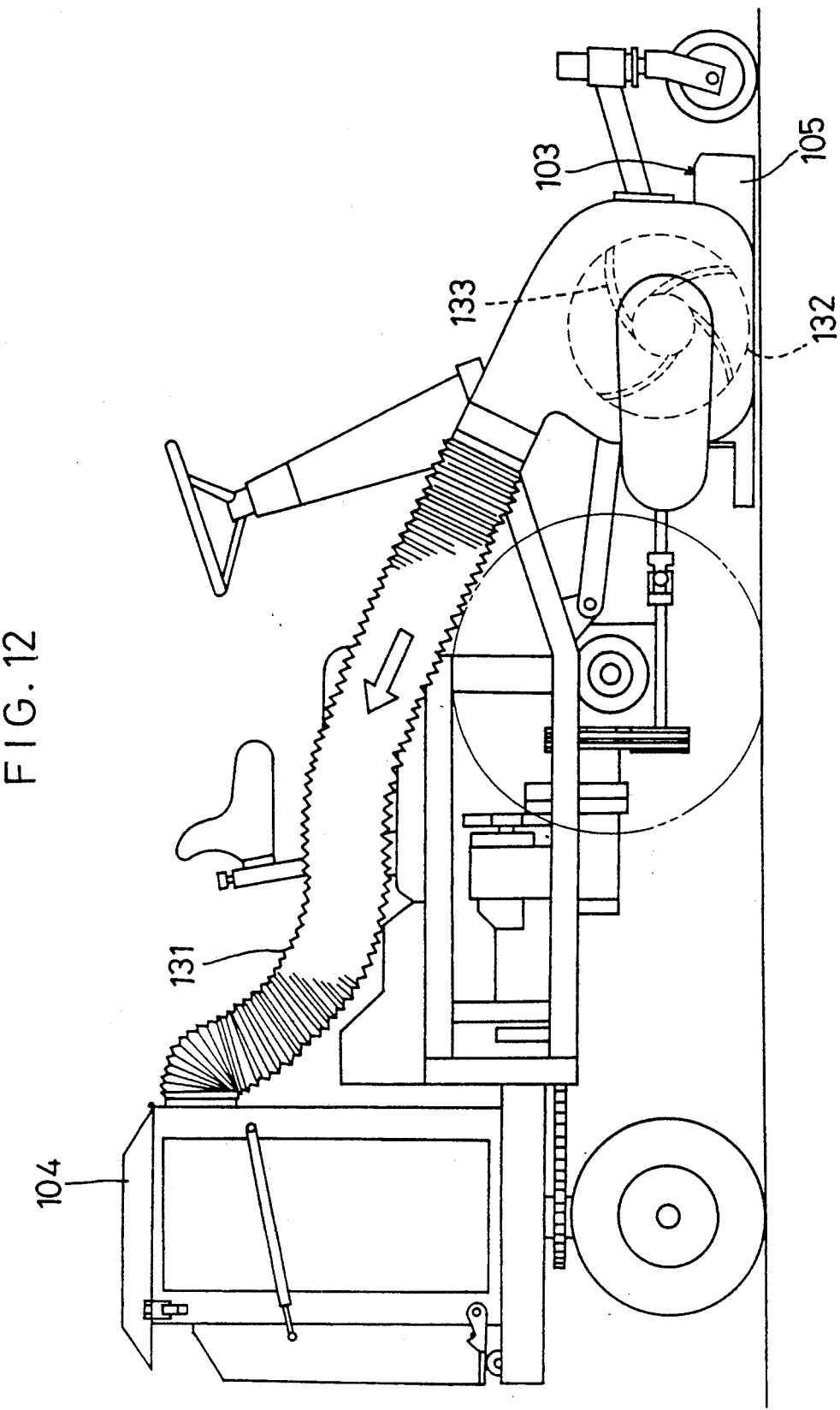
FIG. 12 is a side elevation of another riding type lawn mower.

FIG. 12 shows a front-mount type lawn mower, which comprises a cutting unit 103, a grass catcher 104, a blade housing 105, a grass delivery duct 131, a blower case 132 and a rotary vane 133. This lawn mower has the cutting unit 103 connected to a lower forward position thereof, and the grass catcher 104 mounted rearwardly for collecting grass clippings delivered from the cutting unit 103. The present invention is also applicable to this type of lawn mower with the cutting unit disposed at the lower forward position thereof.

What is claimed is:

1. A lawn mower comprising:
   a blade housing supported above the ground by at least one wheel,
   a blower case removably connected to one lateral side of said blade housing for blowing grass clippings toward a grass catcher disposed rearwardly of a vehicle body, and a blower mounted in the blower case,
   a wheel support frame in the form of at least one elongated rigid member, said wheel support frame being secured only to said blade housing and said elongated rigid member extending beyond said blade housing in at least one of a fore and aft direction relative to the vehicle body, said at least one wheel being fixed to said wheel support frame, and coupling means fixed to said wheel support frame for connecting said blower case to said blade housing.

2. A lawn mower as claimed in claim 1, wherein said coupling means includes a first coupling and a second coupling spaced apart from each other in the fore and aft direction of the vehicle body, said first coupling having an engaging connection structure, and said second coupling having a pin connection structure.

3. A lawn mower as claimed in claim 2, wherein said first coupling includes a vertical pin extending from a coupling member provided on said blower case, and engaging recesses defined in said blade housing, said engaging recesses having curved deep ends for receiving said vertical pin.

4. A lawn mower as claimed in claim 2, wherein said second coupling includes a U-shaped coupling pin provided on said blower case, and a coupling boss fixed to said blade housing, said coupling pin being pivotable on a vertical axis, slidable along said vertical axis, and spring-loaded downwardly for insertion into said boss.

5. A lawn mower as claimed in claim 3, wherein said blade housing includes a coupling member formed of a square pipe extending rightward from said support frame, said engaging recesses being defined in upper and lower faces of said square pipe.

6. A lawn mower as claimed in claim 3, wherein said coupling member of said blower case is formed of a channel-shaped frame bolted to said blower case and extending laterally therefrom, said vertical pin being provided on a free end of said channel-shaped frame and fixedly carrying a pair of abutment regulating plates for preventing vertical displacement relative to the upper and lower faces of the square pipe when said vertical pin enters said engaging recesses.

7. A lawn mower as claimed in claim 3, wherein said coupling member of said blower case includes a contact member for contacting an abutment plate provided on the coupling member of said blade housing to restrict movement in the fore and aft direction of said vertical pin placed in said engaging recesses.

8. A lawn mower as claimed in claim 7, wherein said abutment plate is provided on a front edge of said square pipe, with said frame acting also as the contact member.

9. A lawn mower as claimed in claim 2, wherein said first coupling and said second coupling are reversed in the fore and aft direction.

10. A lawn mower comprising:
    a blade housing supported above the ground by at least one wheel,
    a blower case removably connected to one lateral side of said blade housing for blowing grass clippings toward a grass catcher disposed rearwardly of a vehicle body,
    wheel support frame means secured to said blade housing and extending in a fore and aft direction of the vehicle body, and
    coupling means fixed to said wheel support frame means for connecting said blower case to said blade housing, said coupling means including a first coupling and a second coupling spaced apart from each other in the fore and aft direction of the vehicle body, said first coupling having an engaging connection structure, said engaging connection structure including a vertical pin extending from a coupling member provided on said blower case, and engaging recesses defined in said blade housing, said engaging recesses having curved deep ends for receiving said vertical pin, and said second coupling having a pin connection structure.

11. A lawn mower comprising;
    a blade housing supported above the ground by wheels, a blower case removably connected to one lateral side of said blade housing for blowing grass clippings toward a grass catcher disposed rearwardly of a vehicle body, wheel support frame means secured to said blade housing and extending in a fore and aft direction of the vehicle body, and coupling means fixed to said wheel support frame means for connecting said blower case to said blade housing, said coupling means including a first coupling and a second coupling spaced apart from each other in the fore and aft direction of the vehicle body, said first coupling having an engaging connection structure, and said second coupling having a pin connection structure, said pin connection structure including a U-shaped coupling pin provided on said blower case, and a coupling boss fixed to said blade housing, said coupling pin being pivotable on a vertical axis, slidable along said vertical axis, and spring-loaded downwardly for insertion into said boss.

12. A lawn mower as claimed in claim 10, wherein said blade housing includes a coupling member formed of a square pipe extending rightward from said support frame means, said engaging recesses being defined in upper and lower faces of said square pipe.

13. A lawn mower as claimed in claim 10, wherein said coupling member of said blower case is formed of a channel-shaped frame bolted to said blower case and extending laterally therefrom, said vertical pin being provided on a free end of said channel-shaped frame and fixedly carrying a pair of abutment regulating plates for preventing vertical displacement relative to the upper and lower faces of the square pipe when said vertical pin enters said engaging recesses.

14. A lawn mower as claimed in claim 10, wherein said coupling member of said blower case includes a contact member for contacting an abutment plate provided on the coupling member of said blade housing to restrict movement in the fore and aft direction of said vertical pin placed in said engaging recesses.

15. A lawn mower as claimed in claim 14, wherein said abutment plate is provided on a front edge of said square pipe, with said frame means acting also as the contact member.

16. A lawn mower as claimed in claim 10, wherein said first coupling and said second coupling are reversed in the fore and aft direction.

17. A lawn mower as claimed in claim 11, wherein said first coupling and said second coupling are reversed in the fore and aft direction.

18. A lawn mower comprising;
a blade housing supported above the ground by at least one wheel,
a blower case removably connected to one lateral side of said blade housing for blowing grass clippings toward a grass catcher disposed rearwardly of a vehicle body,
a wheel support frame in the form of at least one elongated rigid member secured to said blade housing and extending in a fore and aft direction of the vehicle body, said at least one wheel being fixed to said wheel support frame, and
coupling means fixed to said wheel support frame for connecting said blower case to said blade housing, said coupling means including a first coupling and a second coupling spaced apart from each other in the fore and aft direction of the vehicle body, said first coupling having an engaging connection structure, and said second coupling having a pin connection structure, engaging recesses defined in said blade housing, said engaging recesses having curved deep ends for receiving said vertical pin, said second coupling including a U-shaped coupling pin provided on said blower case, and a coupling boss fixed to said blade housing, said coupling pin being pivotable on a vertical axis, slidable along said vertical axis, and spring-loaded downwardly for insertion into said boss.

19. A lawn mower comprising;
a blade housing supported above the ground by at least one wheel,
a blower case removably connected to one lateral side of said blade housing for blowing grass clippings toward a grass catcher disposed rearwardly of a vehicle body,
a wheel support frame in the form of at least one elongated rigid member secured to said blade housing and extending in a fore and aft direction of the vehicle body, said at least one wheel being fixed to said wheel support frame, and
coupling means fixed to said wheel support frame for connecting said blower case to said blade housing, said coupling means including a first coupling and a second coupling spaced apart from each other in the fore and aft direction of the vehicle body, said first coupling having an engaging connection structure, and said second coupling having a pin connection structure, said first coupling including a vertical pin extending from a coupling member provided on said blower case, and engaging recesses defined in said blade housing, said engaging recesses having curved deep ends for receiving said vertical pin.

20. A lawn mower as claimed in claim 19, wherein said blade housing includes a coupling member formed of a square pipe extending rightward from said support frame, said engaging recesses being defined in upper and lower faces of said square pipe.

21. A lawn mower as claimed in claim 19, wherein said coupling member of said blower case is formed of a channel-shaped frame bolted to said blower case and extending laterally therefrom, said vertical pin being provided on a free end of said channel-shaped frame and fixedly carrying a pair of abutment regulating plates for preventing vertical displacement relative to the upper and lower faces of the square pipe when said vertical pin enters said engaging recesses.

22. A lawn mower as claimed in claim 19, wherein said coupling member of said blower case includes a contact member for contacting an abutment plate provided on the coupling member of said blade housing to restrict movement in the fore and aft direction of said vertical pin placed in said engaging recesses.

23. A lawn mower as claimed in claim 22, wherein said abutment plate is provided on a front edge of said square pipe, with said frame acting also as the contact member.

* * * * *